United States Patent
Meck et al.

(10) Patent No.: US 11,892,368 B2
(45) Date of Patent: Feb. 6, 2024

(54) CONDITION MONITORING APPARATUS

(71) Applicant: John Crane UK Limited, Slough (GB)

(72) Inventors: Klaus Meck, Slough (GB); Sebastian Sztendel, Slough (GB)

(73) Assignee: JOHN CRANE UK LIMITED, Slough (GB)

( * ) Notice: Subject to any disclaimer, the term of this patent is extended or adjusted under 35 U.S.C. 154(b) by 0 days.

(21) Appl. No.: 17/802,414

(22) PCT Filed: Feb. 24, 2021

(86) PCT No.: PCT/GB2021/050454
§ 371 (c)(1),
(2) Date: Aug. 25, 2022

(87) PCT Pub. No.: WO2021/170998
PCT Pub. Date: Sep. 2, 2021

(65) Prior Publication Data
US 2023/0082945 A1  Mar. 16, 2023

(30) Foreign Application Priority Data
Feb. 25, 2020 (GB) .................................... 2002610

(51) Int. Cl.
*G01M 13/005* (2019.01)
*F16J 15/34* (2006.01)

(52) U.S. Cl.
CPC ....... *G01M 13/005* (2013.01); *F16J 15/3492* (2013.01)

(58) Field of Classification Search
CPC ... G01M 13/005; F16J 15/3492; G01H 1/003; G01N 29/14
See application file for complete search history.

(56) References Cited

U.S. PATENT DOCUMENTS

| 4,493,042 A | 1/1985 | Shima et al. |
| 6,065,345 A | 5/2000 | Holenstein et al. |
| 2011/0142621 A1 | 6/2011 | D et al. |

(Continued)

FOREIGN PATENT DOCUMENTS

| EP | 0297729 A2 | 1/1989 |
| GB | 2430034 A | 3/2007 |

(Continued)

OTHER PUBLICATIONS

Abstract for JPH10307081 (A), Published: Nov. 17, 1998, 1 page.

(Continued)

*Primary Examiner* — Manuel L Barbee
(74) *Attorney, Agent, or Firm* — CANTOR COLBURN LLP

(57) ABSTRACT

A condition monitoring apparatus (300) for a system comprising rotating or reciprocating machinery and a seal is disclosed herein. The apparatus comprises a first acoustic sensor (301) coupled to the seal for providing a first acoustic emission signal, a second acoustic sensor (302) coupled to the rotating or reciprocating machinery for providing a second acoustic emission signal, and a filter module (310). The filter module is configured to perform active noise cancellation based on a comparison of the first acoustic emission signal and the second acoustic emission signal.

20 Claims, 8 Drawing Sheets

(56) References Cited

U.S. PATENT DOCUMENTS

| | | | | |
|---|---|---|---|---|
| 2015/0300405 | A1* | 10/2015 | Erskine | G01M 3/2869 |
| | | | | 384/448 |
| 2016/0084801 | A1* | 3/2016 | Robinson | G10K 11/17875 |
| | | | | 181/175 |
| 2020/0110109 | A1* | 4/2020 | Goldswain | G01P 13/045 |
| 2020/0141907 | A1 | 5/2020 | Meck et al. | |

FOREIGN PATENT DOCUMENTS

| | | |
|---|---|---|
| JP | H10307081 A | 11/1998 |
| WO | 2012072984 A2 | 6/2012 |

OTHER PUBLICATIONS

GB Search Report for Application No. GB2002610.0, dated Jul. 17, 2020, 4 pages.
Notification of Transmittal of the International Search Report of the International Searching Authority, or the Declaration; PCT/GB2021/050454; dated May 31, 2021, 4 pages.
Notification of Transmittal of the Written Opinion of the International Searching Authority, or the Declaration; PCT/GB2021/050454; dated May 31, 2021, 5 pages.
1 European Office Action for Application No. 21710031.2, dated Sep. 27, 2023, 6 pages.

* cited by examiner

CONDITION MONITORING APPARATUS

CROSS REFERENCE TO RELATED APPLICATIONS

This is a US National Stage of Application No. PCT/GB2021/050454, filed on Feb. 24, 2021, which claims the benefit of GB Application No. 2002610.0 filed Feb. 25, 2020, the disclosures of which are incorporated herein by reference.

FIELD OF THE INVENTION

The present disclosure relates to a condition monitoring instruments for machinery, for example machinery comprising mechanical seals and a pump, mixer or compressor. More specifically the present disclosure relates to a condition monitoring apparatus that uses acoustic emission (AE) sensors and noise cancellation circuitry to increase the sensing capabilities and efficiency of data acquisition performed by the system.

BACKGROUND

A mechanical seal is a device configured to provide a sealing interface between a static housing and rotating shaft of a device, such as a pump, mixer or the like, for the purpose of inhibiting fluid within the device from escaping and/or external contaminants from entering the device. Mechanical seals are employed in a wide variety of industrial applications, processing media and operating conditions, where a gap between a rotating shaft and a static housing has to be sealed.

Referring to FIG. 1, a cross-sectional view of a mechanical seal 100 of the prior art is depicted. In this depiction, the mechanical seal 100 is configured to inhibit the flow of fluid and contaminants through a gap 102 between a stationary housing 104 and a rotating shaft 106. The mechanical seal 100 is generally comprised of an annular stationary ring 108 (also known as a primary ring) and annular rotating ring 110 (also known as a mating ring), a pair of seals or glands 112, 114 (which are generally, but certainly not limited to, elastomeric sealing elements such as O-rings), and a biasing member 116 depicted in FIG. 1 comprises a single pair of sealing rings 108 and 110, it will be understood that mechanical seals can comprise additional sealing interfaces.

In operation, the annular stationary ring 108 remains fixed in position relative to the housing 104. Gland 112 is positioned between the annular stationary ring 108 and the housing 104 to inhibit the flow of fluid between these components. Annular rotating ring 110 rotates with the rotating shaft 106. Gland 114 is positioned between the annular rotating ring 110 and the rotating shaft 106 to inhibit the flow of fluid between these components.

Both the annular stationary ring 108 and the annular rotating ring 110 include smooth, contacting seal faces 109, 111, thereby forming a sliding seal interface 118. Accordingly, use of the mechanical seal 100 enables the radial gap 102—where fluid would normally escape—to be sealed by a flat, sliding seal interface 118 that is perpendicular to the rotating shaft 106, and therefore much easier to seal. A biasing member 116, such as one or more coil springs and/or a bellows arrangement, can be positioned between a boss 120 on the rotating shaft 106 and the gland 114 and/or annular rotating ring 110 to urge the floating annular rotating ring 110 towards the annular stationary ring 108. In this manner, the biasing member 116 aids in maintaining contact between contact seal faces 109, 111 by accommodating small shaft deflections, shaft movement due to bearing tolerances and out of perpendicular alignment due to manufacturing tolerances.

Because annular rotating ring 110 rotates relative to annular stationary ring 108, there is naturally some wear on the seal faces 109, 111 during operation. In particular, wear of the sliding seal interface 118 can be accelerated in the presence of friction and heat generation, in particular if loading of the components and/or friction is increasing. Excessive wear of the seal faces 109, 111 ultimately leads to failure of the mechanical seal 100.

To slow the rate of wear, often a lubricant, commonly referred to as a lubricating fluid or barrier fluid, is introduced into the seal interface 118. The lubricating fluid can be the fluid to be sealed, or it can be another barrier fluid introduced into the seal interface 118. In another example, the seal interface can be lubricated by a dry gas, such as a vapour of the sealed product, air or nitrogen.

More advanced mechanical seal systems can include multiple mechanical seals, such as a dual or double mechanical seal. Such mechanical seal systems can be provided with more than a single lubricating fluid. For example, in some double seal systems, the first mechanical seal is lubricated by a vapour of the sealed product, and the second mechanical seal is lubricated with another liquid or gas compatible with the sealed product. In some cases, the lubricating fluid of the second mechanical seal can be maintained at a higher pressure to further minimize leaking of the sealed product to the atmosphere.

As with all mechanical systems, eventually the annular stationary ring 108 and the annual rotating ring 110 will wear out and need to be replaced. In some cases, the components of the mechanical seal 100 will simply reach the end of their useful life. In other cases, certain conditions will hasten wear on the components within the mechanical seal 100. Some of these conditions include mis-installation of seal components or improper seal selection, the seal faces opening during operation as a result of axial misalignment or improper loading, flashing (liquid to vapour transition that causes pulsating leakage and chatter of the seal), cavitation, or environmental conditions which can lead to a collapse of the thin film of lubricant.

Efficient operation and maintenance of rotating or reciprocating equipment is essential to maximize production capacity and minimize downtime. Moreover, unexpected catastrophic equipment failure can result in injury to personnel. Fortunately, in many cases the mechanical seal system will begin to show signs of distress in advance of a catastrophic failure, and in some cases indicate the remaining useful life of the components.

Acoustic emission sensors have been used in relation to rotating equipment and machinery to determine component failure and detect signs of distress in advance of catastrophic failure, for example as described in WO 2012/0072984. Advantages of using acoustic emission sensors are that they are non-intrusive and enable real-time monitoring of the system, enabling monitoring in situ.

However, use of such acoustic emission sensors requires careful placement of the acoustic emission sensors to ensure that audible acoustic emissions are detected from the components of the system that need to be monitored. In many cases the acoustic emission sensors cannot be placed at the desired locations close to the seal but instead need to be placed at some distance away on the machinery casing, where the sound consequently has to pass several component interfaces that limit the ability to detect the signal.

SUMMARY OF THE INVENTION

Aspects of the invention are as set out in the independent claims and optional features are set out in the dependent claims. Aspects of the invention may be provided in conjunction with each other and features of one aspect may be applied to other aspects.

In a first aspect of the disclosure there is provided a condition monitoring apparatus for a system comprising rotating or reciprocating machinery and a seal. The apparatus comprises a first acoustic sensor coupled to the seal for providing a first acoustic emission signal, a second acoustic sensor coupled to the rotating or reciprocating machinery for providing a second acoustic emission signal, and a filter module. The filter module is configured to perform active noise cancellation based on a comparison of the first acoustic emission signal and the second acoustic emission signal.

Advantageously such a condition monitoring apparatus means that the placement of the acoustic emission sensors does not need to be so exact—instead there is more flexibility in the placement of the sensors as the apparatus is better suited to deal with the noise generated by the system and component interfaces.

It will be understood that the rotating or reciprocating machinery may comprise a pump, mixer or compressor. The seal may comprise a mechanical seal such as a dry gas seal. In the context of the present disclosure, it will be understood that when an acoustic emission sensor is described as being coupled to the machinery or seal that it means that the acoustic emission sensor is coupled to the machinery or seal in such a way that it can received acoustic signals from the machinery or seal.

The apparatus may be configured to reduce the bandwidth of the first acoustic emission signal and the second acoustic emission signal. For example, the filter module may be configured to reduce the bandwidth of the first acoustic emission signal and/or the second acoustic emission signal, or another module such as a bandwidth reduction module may be configured to reduce the bandwidth of the first acoustic emission signal and/or the second acoustic emission signal. For example, the bandwidth reduction may be performed locally to the machinery and seal whereas the active noise cancellation may be performed remotely to the machinery and seal.

Converting a high bandwidth signal to a lower bandwidth signal and then performing active noise cancellation on that lower bandwidth signal means that cheaper/off-the-shelf components can be used to perform the noise cancellation. In addition, the lower bandwidth signal may result in energy savings as less data may need to be transmitted, which also reduces the computational burden in determining the condition of the system. As an example, a higher bandwidth signal (for example, as received by the acoustic emission sensors) may be in the range of 300 kHz to 1 MHz, whereas the lower bandwidth signal (to which the higher bandwidth signal is reduced) may be in the range of 50 Hz-20 kHz. Transmitting and processing less data may also reduce battery consumption (if a battery is being used), meaning that the condition monitoring system may be left longer between service/maintenance intervals.

In some examples the apparatus is configured to reduce the number of samples of the first acoustic emission signal and the second acoustic emission signal. For example, the filter module may be configured to downsample the first acoustic emission signal and/or the second acoustic emission signal, or another module such as a downsampling module may be configured to downsample the first acoustic emission signal and/or the second acoustic emission signal. For example, the downsampling may be performed locally to the machinery and seal whereas the active noise cancellation may be performed remotely to the machinery and seal.

As with reducing the bandwidth of the signal, downsampling means that cheaper/off-the-shelf components can be used to perform the noise cancellation. In addition, the downsampled signal may result in energy savings as less data may need to be transmitted, which also reduces the computational burden in determining the condition of the system. Transmitting and processing less data may also reduce battery consumption (if a battery is being used), meaning that the condition monitoring system may be left longer between service/maintenance intervals.

In some examples the apparatus is configured to amplify the first acoustic emission signal and the second acoustic emission signal. For example, the filter module may be configured to amplify the first acoustic emission signal and the second acoustic emission signal. Additionally or alternatively each sensor may comprise an amplifier configured to locally amplify the output from its corresponding sensor prior to the signal being sent to the filter module.

The condition monitoring apparatus may be configured to obtain at least one of:
  (i) a first route mean square, RMS, signal from the first acoustic emission signal and a second RMS signal from the second acoustic emission signal; and
  (ii) a first envelope signal from the first acoustic emission signal, and a second envelope signal from the second acoustic emission signal.

The filter module may be configured to perform active noise cancellation based on a comparison of at least one of:
  (iii) the first RMS signal and the second RMS signal, and
  (iv) the first envelope signal and the second envelope signal.

For example, active noise cancellation may comprise inverting the phase of the original signal (also known as antiphase) with a signal of the same amplitude but inverted. The waves combine to form a new wave, in a process called interference, and effectively cancel each other out—an effect which is called phase cancellation.

The RMS and/or envelope signals may be obtained by the filter module—for example the filter module may be configured to process signals received from the first acoustic emission sensor and the second acoustic emission sensor to produce respective RMS and envelope signals. Additionally or alternatively, the apparatus may comprise respective RMS and enveloping modules configured to process signals received from the first acoustic emission sensor and the second acoustic emission sensor to produce respective RMS and envelope signals.

In some examples the envelope signal may be acquired via an analogue circuit, for example using a Schottky diode circuit, optionally with a low pass filter. In some examples the RMS may be obtained via a digital circuit, for example using an AD8456 chip.

The filter module may be configured to perform active noise cancellation based on a comparison of both (i) the first RMS signal and the second RMS signal, and (ii) the first envelope signal and the second envelope signal.

The comparison may comprise a mathematical operation between the first RMS signal and the second RMS signal, and a mathematical operation between the first envelope signal and the second envelope signal. For example, the mathematical operation may comprise a subtraction between the first RMS signal and the second RMS signal, and a subtraction between the first envelope signal and the second envelope signal. In some examples the mathematical operation comprises combining the first RMS signal and the second RMS signal, optional by the inverting the phase of one signal (e.g. by 180 degrees) relative to the other. In this way, the first RMS signal and the second RMS signal may cancel each other out when added together and when 180 degrees out of phase from each other.

In some examples the filter module is configured to rectify the first acoustic emission signal prior to obtaining the first envelope signal, and rectify the second acoustic emission signal prior to obtaining the second envelope signal.

It will be understood that in some examples the apparatus may be configured to communicate with a diagnostic module, or may comprise a diagnostic module. In such examples the filter module may be configured to output a noise-cancelled signal to the diagnostic module for determining the condition of the system. The noise cancelled signal may comprise at least one of (i) an RMS noise-cancelled signal and (ii) an envelope noise-cancelled signal. In some examples the diagnostic module is physically coupled to the system comprising the rotating or reciprocating machinery and the seal (and in some examples the diagnostic module may comprise the filter module), but in other examples the diagnostic module is remote from the system comprising the rotating or reciprocating machinery and the seal—for example the filter module may comprise a communications interface to communicate with the diagnostics module.

In another aspect of the disclosure there is provided a method of monitoring the condition of a system comprising rotating or reciprocating machinery and a seal. The method comprises obtaining first acoustic emission data emitted from the seal, obtaining second acoustic emission data emitted from the pump, and performing active noise cancellation based on a comparison of the first acoustic emission data and the second acoustic emission data.

The method may comprise reducing the bandwidth of the first acoustic emission data and/or the second acoustic emission data prior to performing active noise cancellation.

Additionally or alternatively the method may further comprise reducing the number of samples of the first acoustic emission data and the second acoustic emission data.

In some examples the method further comprises obtaining:
(i) first route mean square, RMS, data from the first acoustic emission data and a second RMS data from the second acoustic emission data; and
(ii) first envelope data from the first acoustic emission data, and second envelope data from the second acoustic emission data.

The method may comprise performing active noise cancellation based on a comparison of at least one of:
(iii) the first RMS data and the second RMS data, and
(iv) the first envelope data and the second envelope data.

In some examples the method further comprises performing active noise cancellation based on a comparison of both (i) the first RMS signal and the second RMS signal, and (ii) the first envelope signal and the second envelope signal. The comparison may comprise, for example, a mathematical operation between the first RMS signal and the second RMS signal, and a mathematical operation between the first envelope signal and the second envelope signal. For example, the mathematical operation may be a subtraction.

The method may further comprise rectifying the first acoustic emission signal prior to obtaining the first envelope signal, and rectifying the second acoustic emission signal prior to obtaining the second envelope signal.

In some examples the method comprises outputting a noise-cancelled signal, and determining a condition of the system based on the noise-cancelled signal. It will be understood that the noise-cancelled signal may comprise at least one of (i) an RMS noise-cancelled signal and (ii) an envelope noise-cancelled signal. In some examples the method comprises transmitting the noise-cancelled signal to a remote device via a communications interface for determining a condition of the system.

Determining a condition of the system may comprise:
establishing a baseline condition for the first acoustic emission data;
establishing a baseline condition for the second acoustic emission data; and
determining if at least one of the first acoustic emission data and the second acoustic emission data exceed the baseline by a selected threshold. For example, the selected threshold may be a time and/or amplitude threshold.

In another aspect there is provided a computer readable non-transitory storage medium comprising a program for a computer configured to cause a processor to perform the method of monitoring the condition of a system comprising rotating or reciprocating machinery and a seal as described above.

DRAWINGS

Embodiments of the disclosure will now be described, by way of example only, with reference to the accompanying drawings, in which.

SPECIFIC DESCRIPTION

Embodiments of the disclosure relate to a condition monitoring apparatus for a system comprising rotating or reciprocating machinery (such as a pump) and a seal. In general terms, the condition monitoring system, receives acoustic emission signals or data from respective acoustic emission sensors, and performs active noise cancellation based on a comparison of the two signals or data. Advantageously, by performing noise cancellation in this manner, the placement of the acoustic emission sensors relative to the seal and the rotating or reciprocating machinery does not need to be so precise, as the noise cancellation can remove noise from the acoustic signals or data that may be performed by other components and component interfaces in the vicinity of the seal and rotating or reciprocating machinery.

Additionally, embodiments of the disclosure also optionally downsample and/or reduce the bandwidth of the acoustic emission signals or data prior to the active noise cancellation being performed. Advantageously this may mean that the volume of data being sent to the noise cancellation circuitry can be reduced. This may mean that cheaper, off the shelf, components can be used to perform noise cancellation. It also means that less data is being processed, which can reduce computational burden and reduce energy consumption. This may be particularly relevant if analysis of the data output from the condition monitoring system is transmitted elsewhere (for example, wirelessly) for processing remotely (such as in the cloud or on a remote device/controller).

Figure 1:
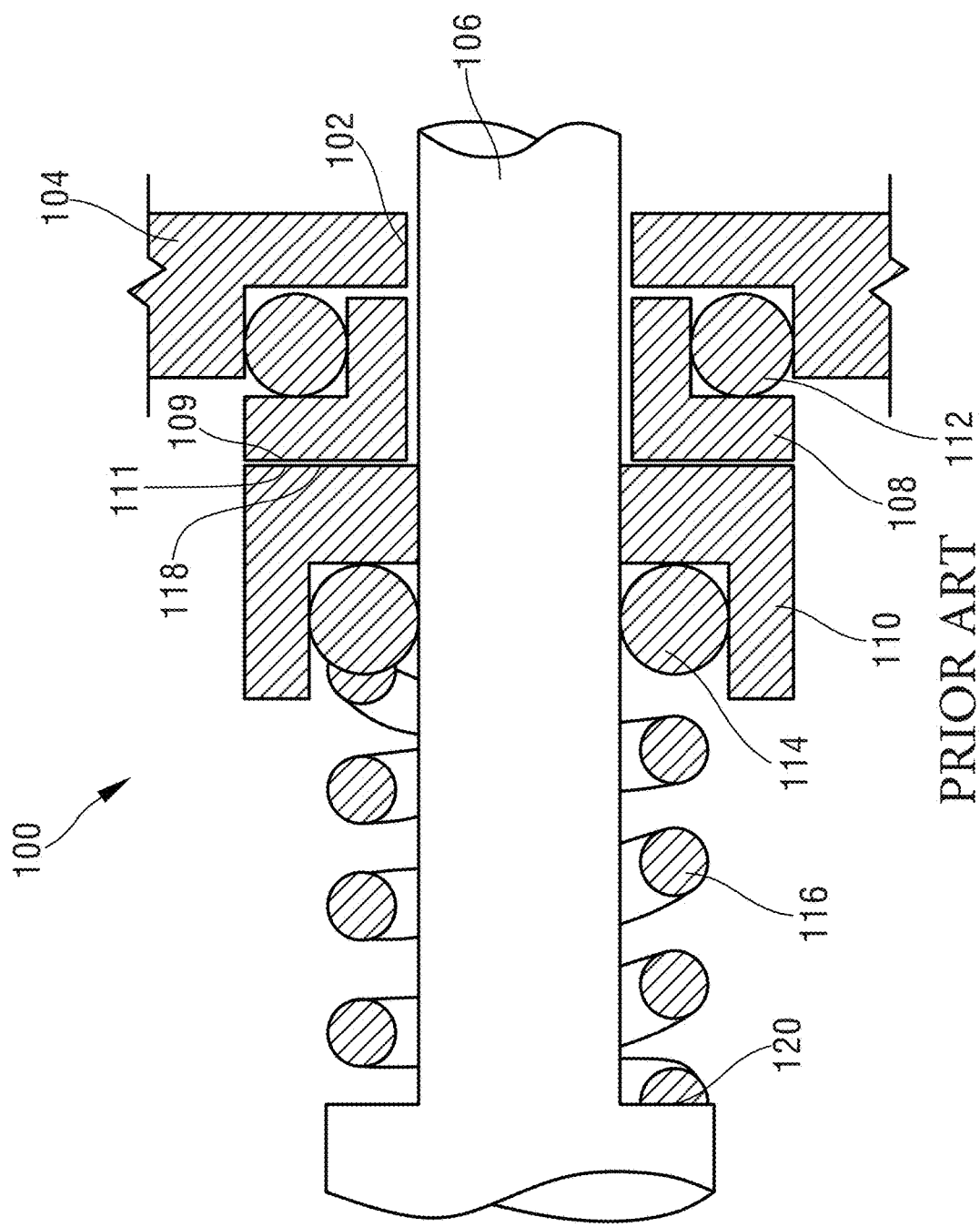
FIG. 1 shows a cross-sectional view of a mechanical seal of the prior art.
Figure 2:
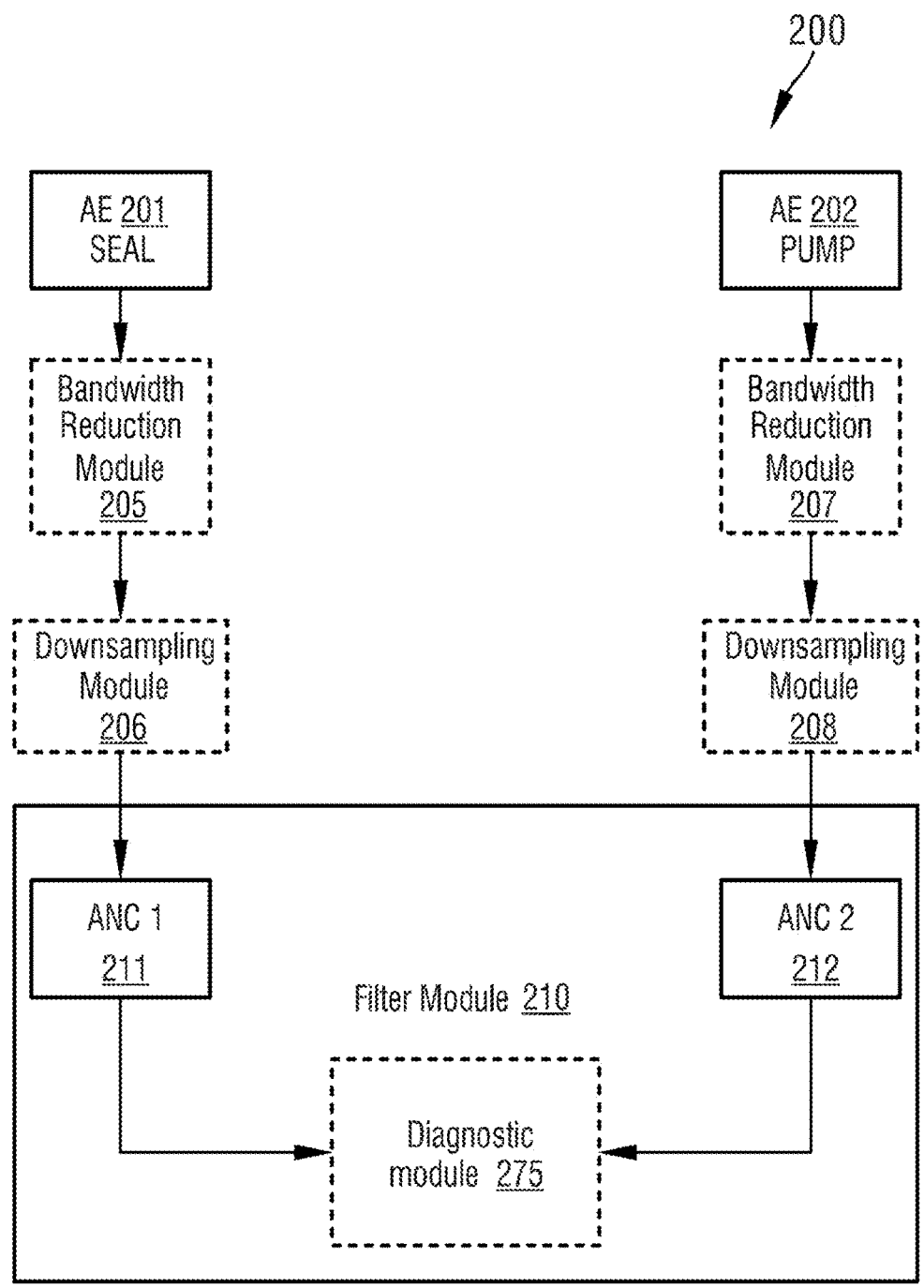
FIG. 2 shows a schematic functional block diagram of an example condition monitoring apparatus of examples of the disclosure.

FIG. 2 depicts a functional schematic block diagram of an illustrative condition monitoring apparatus 200 that may facilitate establishing and/or determining seal conditions for seals and/or other suitable seal systems (for example, operating conditions for a seal, operational conditions for a seal interface, etc.) and/or machinery involving a rotating or reciprocating assembly, such as a pump, mixer or compressor. The seal monitoring system 200 may include and/or may be configured to monitor a seal interface of a dry gas seal disposed between a rotatable shaft and a stationary housing, or it may, for example, involve a liquid lubricated seal, for example the mechanical seal as shown in FIG. 1. Indeed it will be understood that embodiments of the disclosure may be configured to provide a condition monitoring apparatus for mechanical seals (gas seals or liquid lubricated seals) and/or bearings, each of which may emit different acoustic traces or resonances.

The example condition monitoring system 200 shown in FIG. 2 comprises respective acoustic emission sensors 201, 202, for respectively coupling proximate to the seal and the pump.

In some cases, at least one of the acoustic emission sensors 201, 202 may be coupled relative to and/or otherwise stationary relative to a stator portion of the seal and, in some cases, may be formed as part of the stator portion of the seal. Alternatively or in addition, at least one of the acoustic emission sensors 201, 202 may be secured relative to a housing component of a system to which the seal is applied and/or may be remote from the seal and/or the system to which the seal is applied. In some examples the condition monitoring system 200 as a whole may be coupled relative to and/or otherwise stationary relative to a stator portion of the seal and, in some cases, may be formed as part of the stator portion of the seal. Alternatively or in addition, at least a portion of the condition monitoring system 200 may be secured relative to a housing component of a system to which the seal is applied and/or may be remote from the seal and/or the system to which the seal is applied.

The acoustic emission sensors 201, 202 may be piezoelectric transducers configured to convert acoustic signal into analogue signals. For example, the acoustic emission sensors may comprise those described in U.S. Pat. No. 4,493,042.

Each acoustic emission sensor 201, 202 is optionally coupled to a respective bandwidth reduction module 205, 207, and an optional downsampling module 206, 208. In the example shown in FIG. 2 the bandwidth reduction modules 205, 207 and the downsampling modules 206, 208 are arranged in series, but it will be understood that in other examples the modules may be provided in parallel and/or the functionality provided by the same component. In addition, it will be understood that the optional downsampling modules 206, 208 and/or the optional bandwidth reduction modules 205, 207 may be provided as part of the acoustic emissions sensors 201, 202 and/or as part of the filter module 210.

In the example shown in FIG. 2, each optional downsampling module 206, 208 is coupled to a filter module 210. In the example shown, the filter module comprises a first ANC input 211 for receiving signals from the first acoustic emission sensor 201 and a second ANC input 212 for receiving signals from the second acoustic emission sensor 202.

The filter module 210 comprises active noise cancellation circuitry. For example, the filter module may comprise an Ams® AS342x Ambient Noise Cancellation Speaker Driver. In some examples the filter module 210 comprises an internal OTP-ROM that can optionally be used to store gain calibration settings as well as all application specific settings.

In the example shown in FIG. 2, the filter module 210 comprises a diagnostic module 275, coupled to the filter module 210 such that it receives two outputs from the filter module corresponding to signals received from the first acoustic emission sensor 201 and the second acoustic emission sensor 202. It will be understood that being provided as part of the filter module 210 may mean that the diagnostic module 275 is provided in a common enclosure or housing with the filter module 210.

The diagnostic module 275 may comprise, among other features, a processor, a memory (e.g. a non-transitory medium configured to store instructions for execution by the processor, data, and/or other information), and/or an input/output (I/O). The I/O may include one or more I/O interfaces and may receive noise-cancelled signals from the first acoustic emission sensor 201 and the second acoustic emissions sensor 202 via the filter module 210.

Although the diagnostic module 275 shown in FIG. 2 is shown as being (functionally, at least) part of the filter module 210, it will be understood that in some examples (as in FIG. 3), the diagnostic module 275 may be provided remote from the filter module 210, such as in the cloud or on a remote device or controller, such as a controller for the system being monitored.

In addition, although the acoustic emission sensors 201, 202 are shown as being separate to the filter module 210, it will be understood that in some examples the acoustic emission sensors 201, 202 (and also optionally the optional bandwidth reduction modules 205, 207, and optional downsampling modules 206, 208) may additionally or alternatively be provided as part of the filter module 210, for example within a common housing or enclosure.

The acoustic emissions sensors 201, 202, which may be incorporated into the filter module 210, are configured to output a signal (for example, to the diagnostic module 275 or other component) indicative of an operational condition of a seal interface of the dry gas seal (e.g., an operational condition of a first seal face relative to a second seal face).

The respective optional bandwidth reduction modules 205, 207 may be configured to reduce the bandwidth of the signals output from the respective acoustic emissions sensors 201, 202. For example, the bandwidth reduction modules 205, 207 may be configured to envelope the respective signals.

The respective optional downsampling modules 206, 208 may be configured to downsample the respective signals from the acoustic emission sensors 201, 202. For example, the downsampling modules 206, 208 may be configured to take a root mean square of the respective signals.

The filter module 210 may be configured to provide active noise cancellation based on a comparison of the signals received from the respective first and second acoustic emission sensors 201, 202, for example by providing feed-back cancellation with filter loop transfer function.

The optional diagnostic module 275 may be configured to use the respective noise-cancelled signals corresponding to the first acoustic emission sensor 201 and the second acoustic emissions sensor 202 from the filter module 210 to establish an operating condition of the seal and/or determine one or more other parameter values related to the seal based at least in part on the received signals. In some cases, based at least in part on the respective noise-cancelled signals (for example, the time domain and/or frequency domain of the signals), the diagnostic module 275 may be configured to determine parameter values relating to the seal including, but not limited to, a lift off at the seal interface, a touch down at the seal interface, when maintenance is needed, an operating condition of the seal interface, and/or other suitable parameter values related to operation of the seal.

In some examples, the diagnostic module 275 may be configured to detect and/or predict failure based on at least one of: loss of lubrication resulting in seizure; presence of foreign matters; pressure reversal of lubricating fluid; mechanical failure e.g. scars marked on respective portions of the bearing. This may be indicated, for example, by cavitation.

The analysis performed by the diagnostic module 275 may comprise determination of high order statistical values such as Skewness and Kurtosis to help identify potential faults. In some examples such a statistical analysis may be combined with use of a Fast Fourier Transform to provide an indication of the health of the system, for example as described in WO 2012/072984. For example, the diagnostic module 275 may be configured to apply the following equation (Equation 1) to determine the condition of the system being monitored:

$$\text{Coupling Health} = \frac{1}{(C3 \times C4)^2 \times e^{\frac{\left(FFTf_{shift}-FFTf_{Z2}\right)+\left(FFTf_{shift2}-FFTf_{Z2}\right)+\ldots+\left(FFTf_{shiftN}-FFTf_{Z2}\right)}{n}}} \quad \text{Equation 1}$$

Where:

$$FFTf_{\Sigma Z} = \frac{\sum_{i=1}^{Z} fi}{Z}$$

is the average FTT (Fast Fourier Transformation) for first Z frequency bards, whereby Z is an integer $FFT_{shaft}$ is the Fast Fourier Transformation for the first frequency of the coupling shaft $FFT_{shaft2}$ is the Fast Fourier Transformation for the second frequency of the coupling shaft $FFT_{shaftN}$ is the Fast Fourier Transformation for the $n^{th}$ frequency of the coupling shaft, whereby n is an integer and n<Z C3 is the Skewness value C4 is the Kurtosis value The above equation is a typical example of mathematical statistical function used to determine coupling health. Other combinations of values in mathematical statistical function may provide similar results and may be used without departing from the scope of the invention.

In use, the acoustic emission sensors 201, 202 may output a signal indicative of their measurements to the filter module 210 and/or optional diagnostic module 275 for processing (for example, for processing by a processor and/or other computing component). These signals are sent via the optional bandwidth reduction modules 205, 207 and/or the optional downsampling modules 206, 208 to respective inputs of the filter module 201. The active noise cancelling circuitry in the filter module 210 performs active noise cancellations and outputs signals to the diagnostic module 275.

For example, both time domain and frequency domain of the noise-cancelled signals are sent to the diagnostic module 275 to determine the occurrence and frequency of signal characteristics with respect to the system being monitored. For example, the diagnostic module 275 may use Equation 1 to determine the condition of the system being monitored.

In some examples the diagnostic module may be configured to further provide some form of feedback to the user. For example, the apparatus may comprise a plurality of visual indicators, such as LEDs, that provide an indication of the condition of the system to a user. For example, if the condition of the system is such that it is operating within a first selected range, a first visual indication (such as the illumination of green LEDs) may be provided to the user, indicating that the system is running correctly. If the condition of the system is such that it is operating within a second selected range, a second visual indication (such as the illumination of amber LEDs) may be provided to the user, which may indicate that the system is not running optimally and/or a predicted failure of a component such as the seal. If the condition of the system is such that it is operating within a third selected range, a third visual indication (such as the illumination of red LEDs) may be provided to the user, which may indicate that the system is not running correctly and may indicate a failure of a component of the system such as the seal.

In one example, as a seal face of a seal rotates with respect to at least one other seal face of the seal, the seal may emit a sound and the sound may change over time as the seal faces separate from one another (e.g., during run-up of the seal and/or the system to which the seal is applied) and/or come into contact with one another (e.g., during run-down of the seal and/or the system to which the seal is applied), and the acoustic emissions sensors 201, 202 may be configured to sense the emitted sound and provide an indication of when a lift off (e.g., initial separation of the first seal face and the second seal face after the seal faces have been touching) occurs and/or when a touch down (e.g., initial contact between the first seal face and the second seal face as the relative rotation of the seal faces of the seal slows down) occurs.

Although the apparatus described in FIG. 1 uses first and second acoustic emission sensors 201, 202, it will be understood that the apparatus may make use of other and/or additional sensors, and that signals indicative of the outputs of these sensors may be provided to the filter module 210 and/or the diagnostic module 275. For example, the system may additionally comprise a speed sensor (for example, providing an indication of the speed of revolution of the machinery), and the diagnostic module 275 may use signals from the speed sensor in determining the condition of the system.

Figure 3:
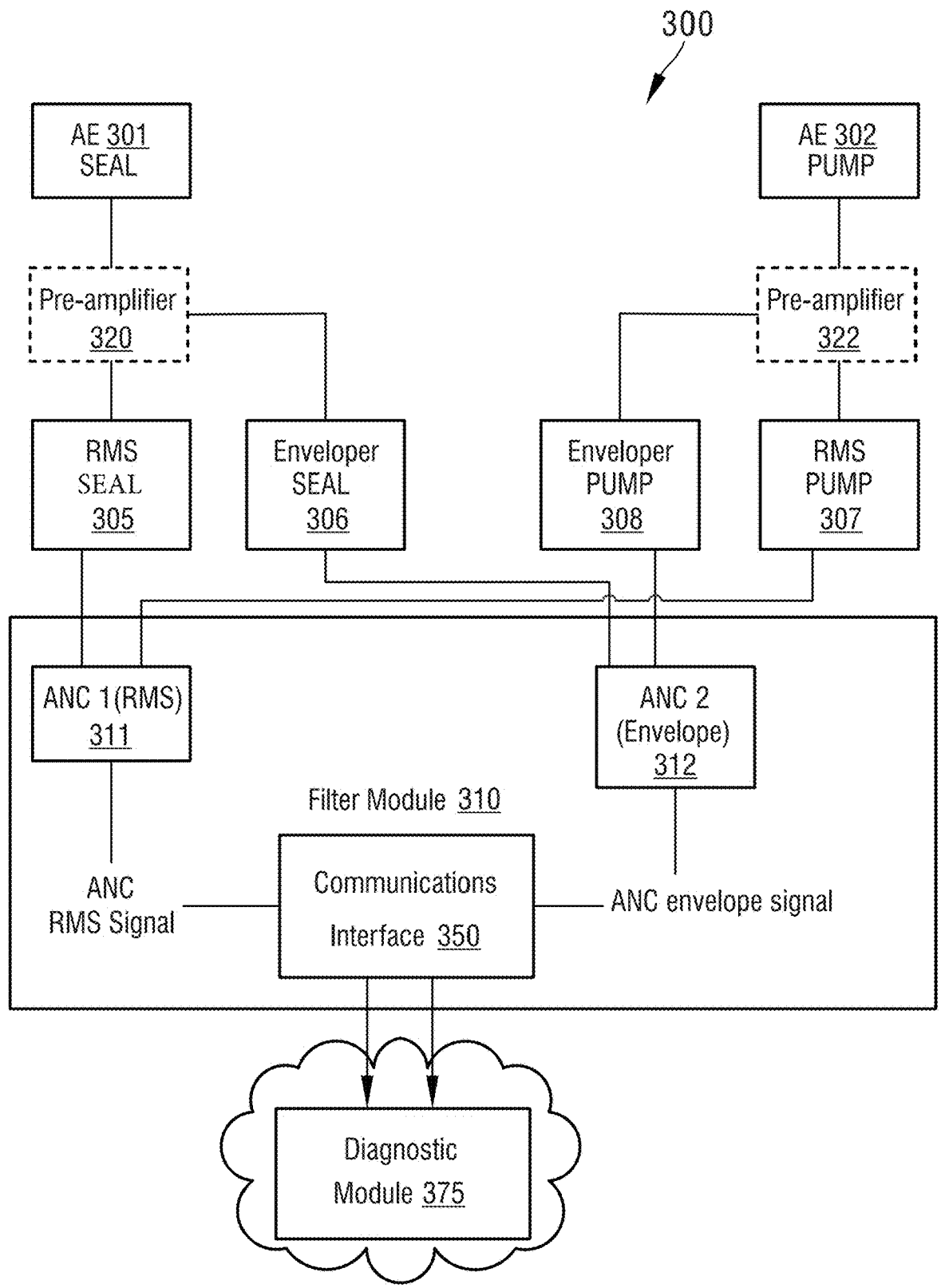
FIG. 3 shows a schematic functional block diagram of another example condition monitoring apparatus of examples of the disclosure.

FIG. 3 shows another example of a condition monitoring apparatus 300. The apparatus 300 shown in FIG. 3 shares many features in common with the apparatus 200 shown in FIG. 2, and it will be understood that features described above in relation to the apparatus shown in FIG. 2 may be used with the example apparatus 300 shown in FIG. 3, and vice versa.

The apparatus 300 shown in FIG. 3 additionally comprises optional respective pre-amplifiers 320, 322 coupled to respective acoustic emission sensors 301, 302.

Coupled to each pre-amplifier 320, 320, in parallel, are respective RMS modules 305, 307, and respective enveloper modules 306, 308. Each of these modules 305, 306, 307, 308 are coupled to respective inputs 311, 312 of the filter module 310, such that the filter module comprises a pair of RMS inputs 311 coupled to the two RMS modules 305, 307, and a pair of envelope inputs 312 coupled to the two enveloper modules 306, 308.

In the example shown in FIG. 3 the filter module 310 also comprises an optional communications interface 350, coupled wirelessly to a diagnostic module 375 which is provided remotely, such as in the cloud.

The RMS modules 305, 307 are configured to obtain a first root mean square, RMS, signal from the first acoustic emission sensor 301, and a second RMS signal from the second acoustic emission 302.

The enveloper modules 306, 308 are configured to obtain a first envelope signal from the first acoustic emission sensor 301, and a second envelope signal from the second acoustic emission sensor 302.

The filter module 310 shown in FIG. 3 is configured to perform active noise cancellation based on a comparison of the first RMS signal and the second RMS signal, and the first envelope signal and the second envelope signal.

In some examples the comparison comprises a mathematical operation between the first RMS signal and the second RMS signal, and a mathematical operation between the first envelope signal and the second envelope signal, such that the comparison is between each pair of signals received by each of the two pairs of inputs 311, 312 of the filter module 310.

The mathematical operation may comprise a subtraction between the first RMS signal and the second RMS signal, and a subtraction between the first envelope signal and the second envelope signal.

The communications interface 350 is configured to transmit (for example, wirelessly, such as via Wi-Fi® or Bluetooth®) signals to the diagnostic module 375. It will be understood that the communications interface 350 may not be configured to send signals to the diagnostic module 375 directly but may send the signals via one or more intermediate nodes or routers and via a combination of different communications networks and/or protocols.

Figure 4:
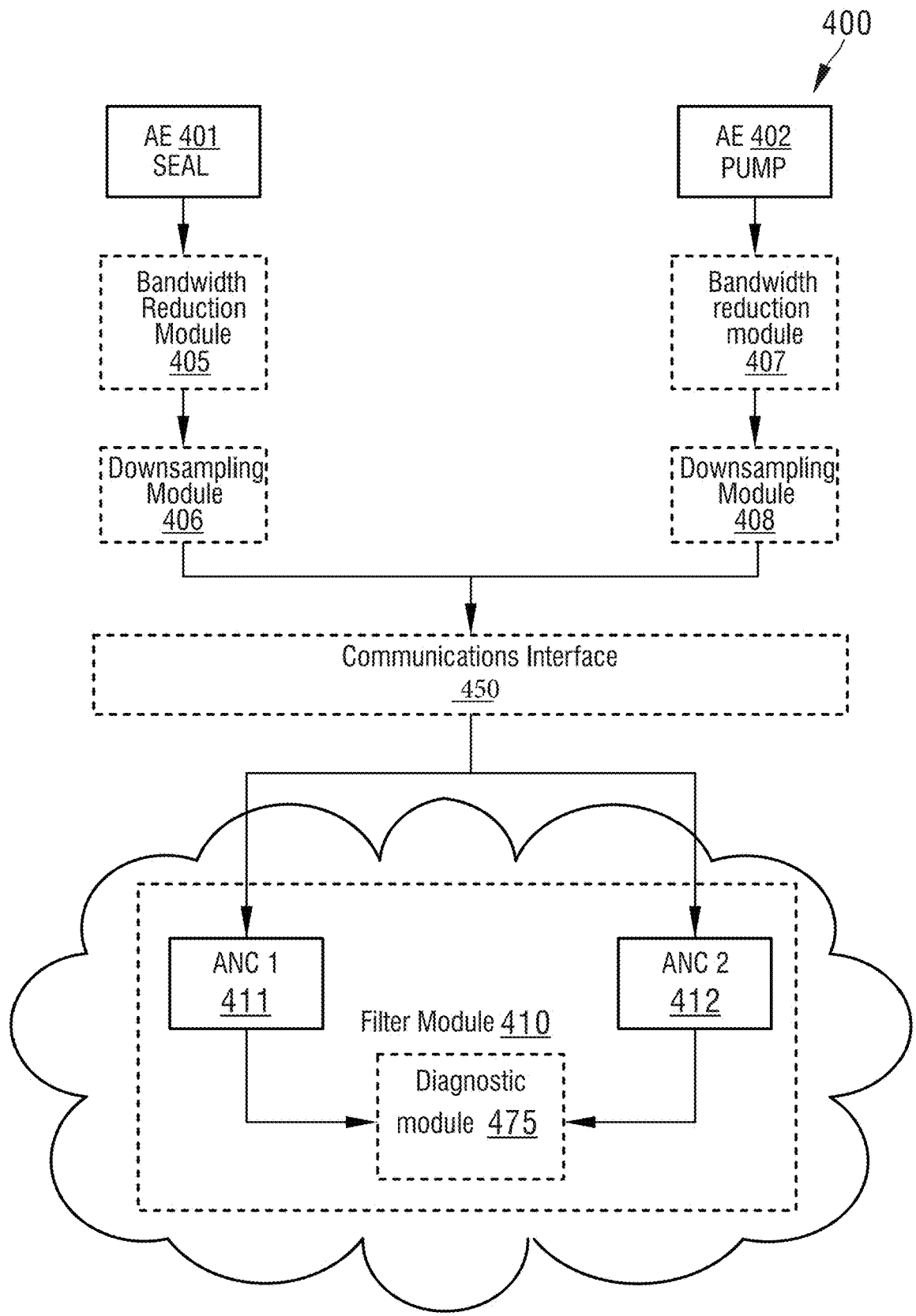
FIG. 4 shows a schematic view of another example condition monitoring apparatus of examples of the disclosure.

FIG. 4 shows another example of a condition monitoring apparatus 400. The apparatus 400 shown in FIG. 4 shares many features in common with the apparatus 200 shown in FIG. 2, and it will be understood that features described above in relation to the apparatus shown in FIG. 2 and in FIG. 3 may be used with the example apparatus 400 shown in FIG. 4, and vice versa. The example condition monitoring system 400 shown in FIG. 4 comprises respective acoustic emission sensors 401, 402, for respectively coupling proximate to the seal and the pump. Each acoustic emission sensor 401, 402 is optionally coupled to a respective bandwidth reduction module 405, 407, and an optional downsampling module 406, 408. In the example shown in FIG. 4, each optional downsampling module 406, 408 is coupled to a filter module 410. In the example shown, the filter module comprises a first ANC input 411 for receiving signals from the first acoustic emission sensor 401 and a second ANC input 412 for receiving signals from the second acoustic emission sensor 402.

The main difference between the apparatus 400 shown in FIG. 4 and the apparatus 200 shown in FIG. 2 is that in the apparatus 400 shown in FIG. 4, the filter module 410 and the diagnostic module 475 are both remote to the acoustic emission sensors 401, 402 and the system being monitored. As such, the apparatus 400 comprises an optional communications interface 450 for sending signals received from the first acoustic emission sensor 401 and the second emission sensor 402 (and that have been reduced in bandwidth and/or downsampled) to the filter module 410 and the diagnostic module 475.

Figure 5:
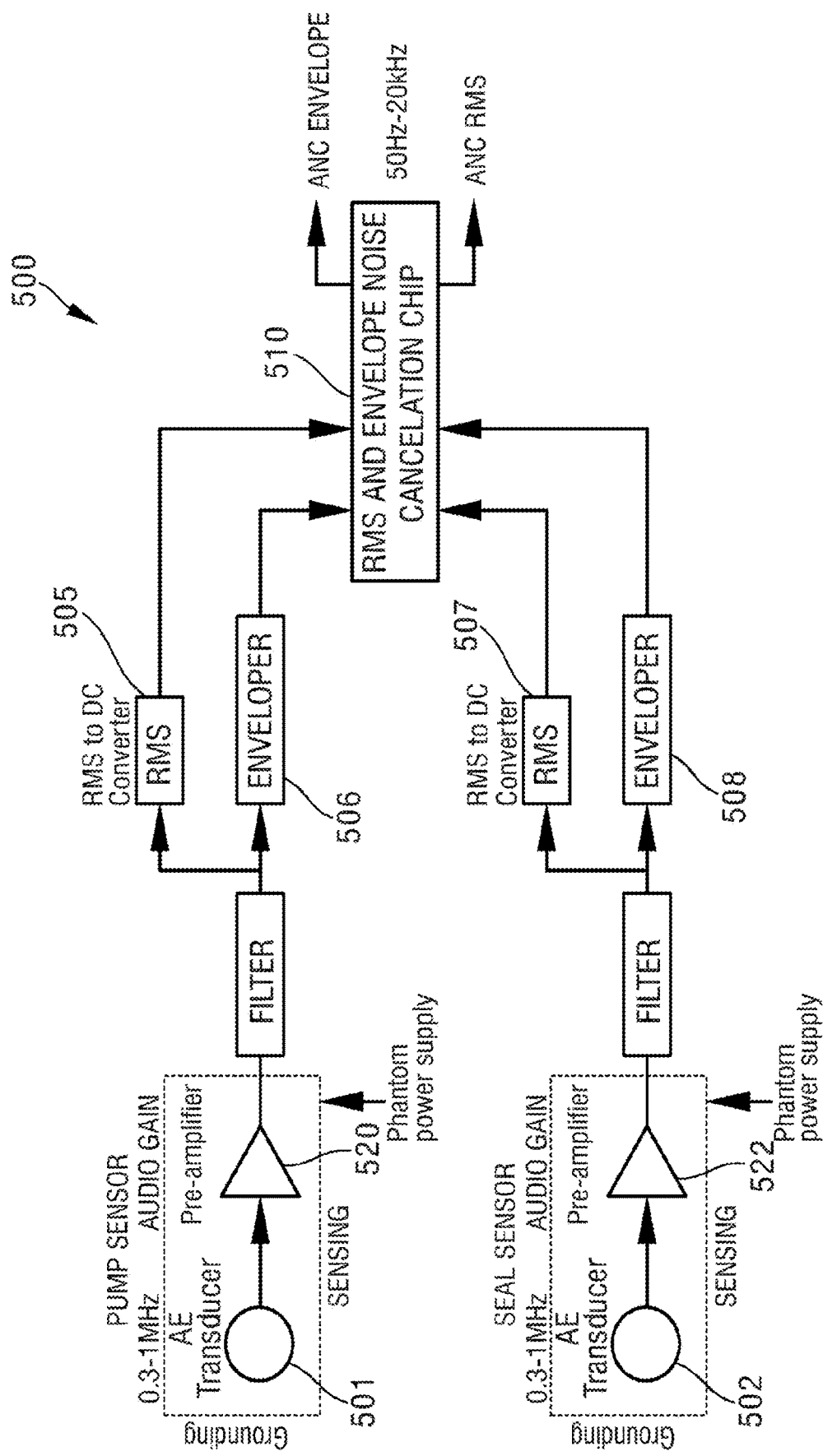
FIG. 5 shows a schematic view of another example condition monitoring apparatus of examples of the disclosure.

FIG. 5 shows a schematic view of another example condition monitoring apparatus 500, and is very similar to the apparatus 300 described above with reference to FIG. 3. The apparatus 500 in FIG. 5 additional comprises the introduction of a phantom power supply to the respective outputs from the first acoustic emission sensor 501 and the second acoustic emission sensor 502, as well as showing that the first and second acoustic emission sensors 501, 502 and optional pre-amplifiers 520, 522 are grounded.

FIG. 5 also shows how the outputs from the first and second acoustic emission sensors are at around 300 kHz, whereas when they are received at the filter module 510 after having been through the respective RMS 505, 507 and enveloper 506, 608 modules, the signal is at around 100 kHz.

Figure 6:
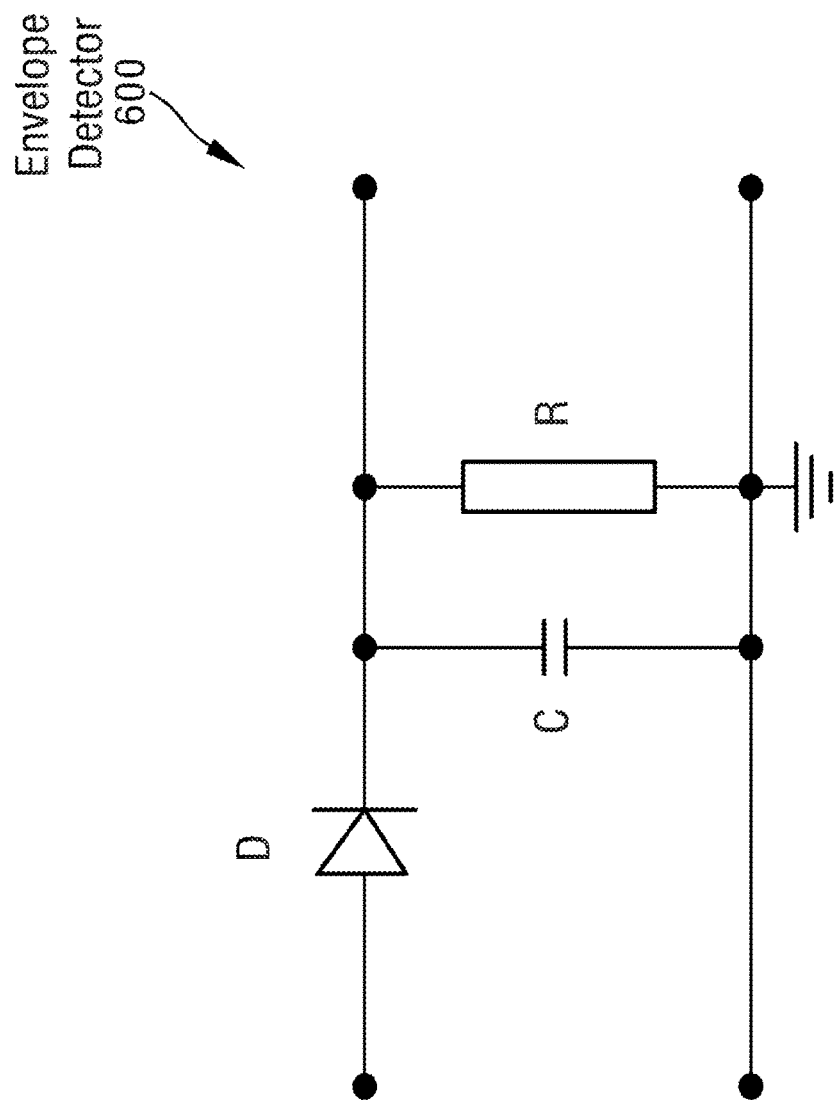
FIG. 6 shows a circuit diagram of an example envelope detector for use with the condition monitoring system of examples of the disclosure.

FIG. 6 shows an example circuit 600 for enveloping used in the enveloper modules described above. The circuit 600 shown in FIG. 6 is configured to rectify the first acoustic emission signal prior to obtaining the first envelope signal, and rectify the second acoustic emission signal prior to obtaining the second envelope signal.

Figure 7:
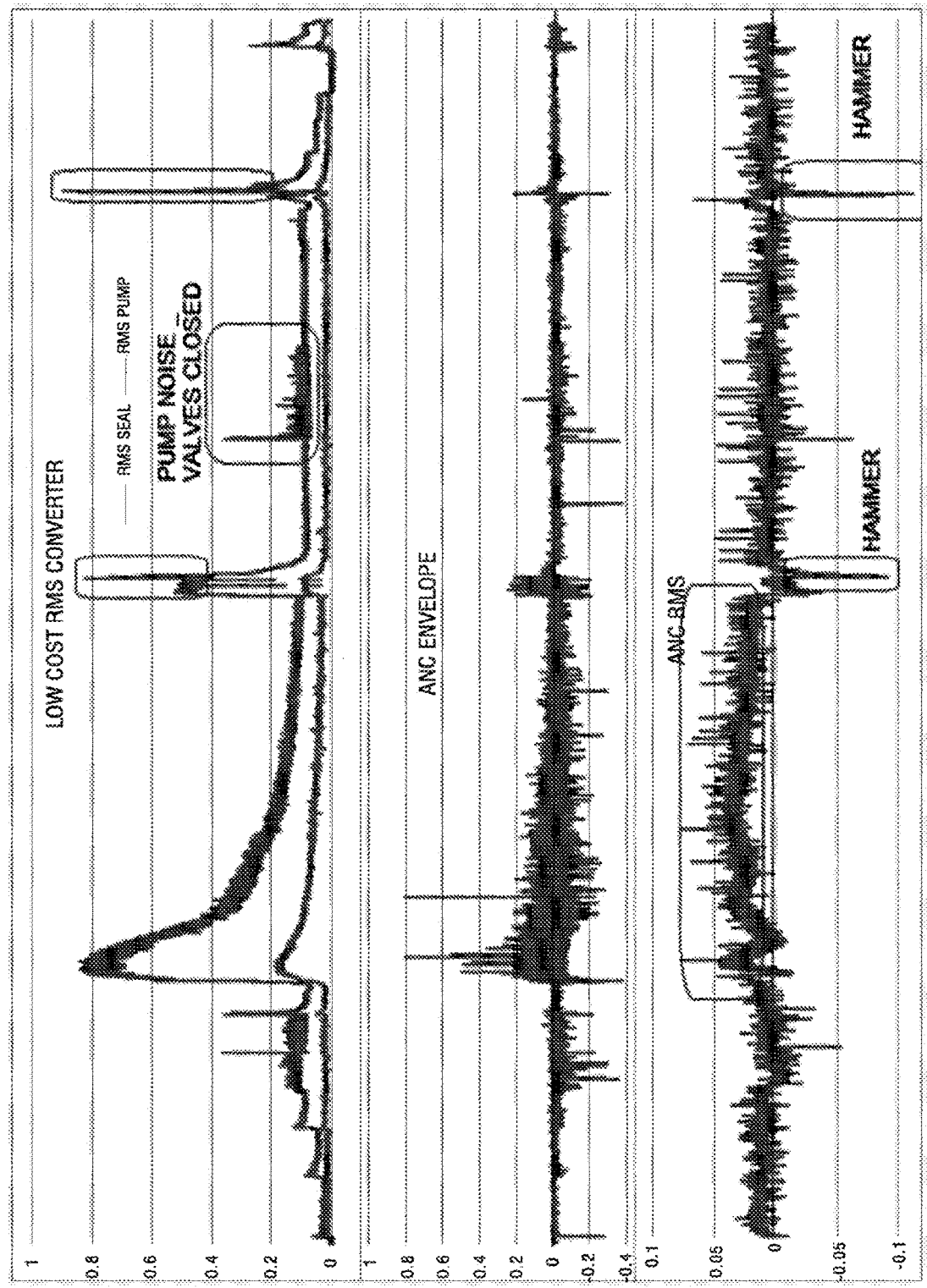
FIG. 7 shows example outputs of a condition monitoring system according to an example of the disclosure.

FIG. 7 shows example outputs of a condition monitoring system according to an example of the disclosure.

Figure 8:
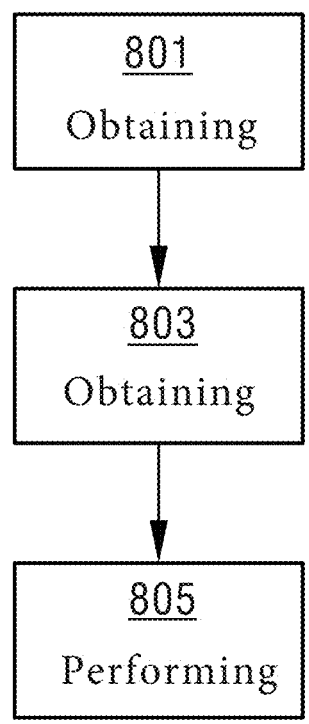
FIG. 8 shows a functional block flowchart of an example method of monitoring the condition of a system of examples of the disclosure.

FIG. 8 shows an example method of monitoring the condition of a system comprising rotating or reciprocating machinery and a seal, for example using the apparatus of any of FIGS. 1 to 5 described above.

The method comprises obtaining 801 first acoustic emission data emitted from the seal (for example, via the first acoustic emission sensors as described above), obtaining 803 second acoustic emission data emitted from the rotating or reciprocating machinery —such as a pump (for example, via the second acoustic emission sensors as described above), and performing 805 active noise cancellation based on a comparison of the first acoustic emission data and the second acoustic emission data (for example, via the filter module as described above).

The method may further comprise reducing the bandwidth of the first acoustic emission data and/or the second acoustic emission data prior to performing active noise cancellation, for example prior to performing 805 active noise cancellation.

The method may further comprise reducing the number of samples of the first acoustic emission data and the second acoustic emission data, for example prior to performing 805 active noise cancellation.

The method may further comprise, for example prior to performing 805 active noise cancellation, obtaining:

(i) first route mean square, RMS, data from the first acoustic emission data and a second RMS data from the second acoustic emission data; and (ii) first envelope data from the first acoustic emission data, and second envelope data from the second acoustic emission data;

and performing active noise cancellation based on a comparison of at least one of:

(iii) the first RMS data and the second RMS data, and (iv) the first envelope data and the second envelope data.

It will be understood that the method may comprise performing active noise cancellation based on a comparison of both (i) the first RMS signal and the second RMS signal, and (ii) the first envelope signal and the second envelope signal. The comparison may comprise a mathematical operation between the first RMS signal and the second RMS signal, and a mathematical operation between the first envelope signal and the second envelope signal.

In some examples the method further comprises rectifying the first acoustic emission signal prior to obtaining the first envelope signal, and rectifying the second acoustic emission signal prior to obtaining the second envelope signal.

After performing 805 active noise cancellation, the method may further comprise outputting a noise-cancelled signal, and determining a condition of the system based on the noise-cancelled signal. For example, the condition of the system may be determined via the diagnostic module as described above.

It will be understood that, to enable this determination of the condition of the system, in some examples the method may comprise transmitting the noise-cancelled signal to a remote device via a communications interface for determining a condition of the system.

Determining a condition of the system may comprise:
establishing a baseline condition for the first acoustic emission data;
establishing a baseline condition for the second acoustic emission data; and
determining if at least one of the first acoustic emission data and the second acoustic emission data exceed the baseline by a selected threshold.

It will also be understood that a computer readable non-transitory storage medium comprising a program for a computer configured to cause a processor to perform the method as described above may be provided.

In the context of the present disclosure other examples and variations of the apparatus and methods described herein will be apparent to a person of skill in the art.

The invention claimed is:

1. A condition monitoring apparatus for a system comprising rotating or reciprocating machinery and a seal, the apparatus comprising:
a first acoustic sensor coupled to the seal for providing a first acoustic emission signal;
a second acoustic sensor coupled to the rotating or reciprocating machinery for providing a second acoustic emission signal; and
a filter module, wherein the filter module is configured to perform active noise cancellation based on a comparison of the first acoustic emission signal and the second acoustic emission signal.

2. The condition monitoring apparatus of claim 1 wherein the apparatus is configured to reduce the bandwidth of the first acoustic emission signal and the second acoustic emission signal.

3. The condition monitoring apparatus of claim 1 wherein the apparatus is configured to reduce the number of samples of the first acoustic emission signal and the second acoustic emission signal.

4. The condition monitoring apparatus of claim 1 wherein the apparatus is configured to amplify the first acoustic emission signal and the second acoustic emission signal.

5. The condition monitoring apparatus of claim 1, wherein the apparatus is configured to obtain at least one of:

(i) a first root mean square, RMS, signal from the first acoustic emission signal and a second RMS signal from the second acoustic emission signal; and (ii) a first envelope signal from the first acoustic emission signal, and a second envelope signal from the second acoustic emission signal;

and wherein the filter module is configured to perform active noise cancellation based on a comparison of at least one of:

(iii) the first RMS signal and the second RMS signal, and (iv) the first envelope signal and the second envelope signal.

6. The condition monitoring apparatus of claim 5 wherein the filter module is configured to perform active noise cancellation based on a comparison of both (i) the first RMS signal and the second RMS signal, and (ii) the first envelope signal and the second envelope signal.

7. The condition monitoring system of claim 5 or 6 wherein the comparison comprises a mathematical operation between the first RMS signal and the second RMS signal, and a mathematical operation between the first envelope signal and the second envelope signal, wherein the mathematical operation comprises a subtraction between the first RMS signal and an inverted or 180 degrees out of phase second RMS signal, and a subtraction between the first envelope signal and an inverted or 180 degrees out of phase second envelope signal.

8. The condition monitoring apparatus of claim 5 wherein the filter module is configured to rectify the first acoustic emission signal prior to obtaining the first envelope signal, and rectify the second acoustic emission signal prior to obtaining the second envelope signal.

9. The condition monitoring apparatus of claim 5 further comprising a diagnostic module, and wherein the filter module is configured to output a noise-cancelled signal to the diagnostic module for determining the condition of the system, wherein the noise cancelled signal comprises at least one of (i) an RMS noise-cancelled signal and (ii) an envelope noise-cancelled signal.

10. The condition monitoring apparatus of claim 9 wherein the diagnostic module is physically coupled to the system comprising the rotating or reciprocating machinery and the seal.

11. The condition monitoring apparatus of claim 9, wherein the diagnostic module is remote from the system comprising the rotating or reciprocating machinery and the seal.

12. The condition monitoring system of claim 9, wherein the diagnostic module comprises the filter module.

13. A method of monitoring the condition of a system comprising rotating or reciprocating machinery and a seal, the method comprising:
obtaining first acoustic emission data emitted from the seal;
obtaining second acoustic emission data emitted from the rotating or reciprocating machinery; and performing active noise cancellation based on a comparison of the first acoustic emission data and the second acoustic emission data.

14. The method of claim 13 further comprising reducing (i) the bandwidth of the first acoustic emission data and/or the second acoustic emission data prior to performing active noise cancellation, and/or (ii) the number of samples of the first acoustic emission data and the second acoustic emission data.

15. The method of claim 13 further comprising obtaining:
   (i) first root mean square, RMS, data from the first acoustic emission data and a second RMS data from the second acoustic emission data; and
   (ii) first envelope data from the first acoustic emission data, and second envelope data from the second acoustic emission data;
   and performing active noise cancellation based on a comparison of at least one of:
   (iii) the first RMS data and the second RMS data, and
   (iv) the first envelope data and the second envelope data.

16. The method of claim 15 wherein the comparison comprises a mathematical operation between the first RMS signal and the second RMS signal, and a mathematical operation between the first envelope signal and the second envelope signal.

17. The method of claim 13 further comprising rectifying the first acoustic emission signal prior to obtaining the first envelope signal, and rectifying the second acoustic emission signal prior to obtaining the second envelope signal.

18. The method of claim 13 further comprising outputting a noise-cancelled signal, and determining a condition of the system based on the noise-cancelled signal, further comprising transmitting the noise-cancelled signal to a remote device via a communications interface for determining a condition of the system.

19. The method of claim 18 wherein determining a condition of the system comprises:
   establishing a baseline condition for the first acoustic emission data;
   establishing a baseline condition for the second acoustic emission data; and
   determining if at least one of the first acoustic emission data and the second acoustic emission data exceed the baseline by a selected threshold.

20. A computer readable non-transitory storage medium comprising a program for a computer configured to cause a processor to perform the method of claim 13.

* * * * *